United States Patent
Pournain et al.

(10) Patent No.: US 11,274,587 B2
(45) Date of Patent: Mar. 15, 2022

(54) SYSTEM AND METHOD FOR CONTROLLING AN INTERNAL COMBUSTION ENGINE PROVIDED WITH AN EXHAUST GAS POST-TREATMENT SYSTEM OF THE SELECTIVE CATALYSIS TYPE

(71) Applicants: CONTINENTAL AUTOMOTIVE FRANCE, Toulouse (FR); CONTINENTAL AUTOMOTIVE GmbH, Hannover (DE)

(72) Inventors: Aymeric Pournain, Cugnaux (FR); Bertrand Varoquie, Eaunes (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/769,904

(22) PCT Filed: Nov. 16, 2018

(86) PCT No.: PCT/FR2018/052880
§ 371 (c)(1),
(2) Date: Jun. 4, 2020

(87) PCT Pub. No.: WO2019/110882
PCT Pub. Date: Jun. 13, 2019

(65) Prior Publication Data
US 2021/0180495 A1 Jun. 17, 2021

(30) Foreign Application Priority Data
Dec. 5, 2017 (FR) ...................................... 1761633

(51) Int. Cl.
*F01N 3/08* (2006.01)
*F01N 3/20* (2006.01)
(Continued)

(52) U.S. Cl.
CPC ........... *F01N 3/208* (2013.01); *F01N 3/0842* (2013.01); *F01N 2560/026* (2013.01);
(Continued)

(58) Field of Classification Search
CPC .. F01N 3/0842; F01N 3/208; F01N 2560/026; F01N 2900/08; F02D 35/023; F02D 2041/1419; F02D 2200/0602
See application file for complete search history.

(56) References Cited

U.S. PATENT DOCUMENTS

| 6,993,901 B2 | 2/2006 | Shirakawa |
| 7,721,535 B2 | 5/2010 | Ruth et al. |

(Continued)

FOREIGN PATENT DOCUMENTS

| CN | 1541300 A | 10/2004 |
| CN | 1910352 A | 2/2007 |

(Continued)

OTHER PUBLICATIONS

International Search Report, dated Feb. 5, 2019, from corresponding PCT application No. PCT/FR2018/052880.

(Continued)

*Primary Examiner* — Audrey B. Walter
(74) *Attorney, Agent, or Firm* — Nixon & Vanderhye (57) ABSTRACT

System for controlling an engine provided with an exhaust gas post-treatment system of the selective catalysis type, including a closed-loop control of $NO_x$ before the gas post-treatment system, according to the following steps: • a unit for determining a $NO_x$ setpoint in dependence on the rotational speed and the torque setpoint of the engine, • a unit (Continued)

for determining a NO value, and • a cascade control unit which is able to determine a setpoint for admitted oxygen and a correction of the supercharging pressure destined for unit for controlling the air loop of the engine as well as a correction of the injection pressure and a correction of the advance of the main injection in dependence on a $NO_x$ difference, between a NOx emission setpoint or corrected emission setpoint and a determined value of the quantity of $NO_x$.

19 Claims, 6 Drawing Sheets

(51) Int. Cl.
  *F02D 35/02* (2006.01)
  *F02D 41/14* (2006.01)
(52) U.S. Cl.
  CPC ........ *F01N 2900/08* (2013.01); *F02D 35/023* (2013.01); *F02D 2041/1419* (2013.01); *F02D 2200/0602* (2013.01)

(56) References Cited

U.S. PATENT DOCUMENTS

| | | |
|---|---|---|
| 7,784,276 B2 | 8/2010 | Ono |
| 8,091,350 B2 | 1/2012 | Suzuki |
| 8,635,859 B2 | 1/2014 | Miao et al. |
| 8,826,644 B2 | 9/2014 | Ponnathpur |
| 8,915,063 B2 | 12/2014 | Auckenthaler |
| 9,115,623 B2 * | 8/2015 | Prothmann ......... F02D 41/0007 |
| 9,181,845 B2 | 11/2015 | Maertens |
| 9,638,122 B2 | 5/2017 | Smith et al. |
| 10,100,768 B2 | 10/2018 | Garimella et al. |
| 2007/0089406 A1 | 4/2007 | Doring |
| 2010/0242934 A1 | 9/2010 | Yonekawa et al. |
| 2015/0032359 A1 | 1/2015 | Tordin |
| 2015/0330322 A1 | 11/2015 | Sarlashkar et al. |
| 2016/0245208 A1 * | 8/2016 | Garimella ........... F02D 41/1441 |

FOREIGN PATENT DOCUMENTS

| | | |
|---|---|---|
| CN | 101463770 A | 6/2009 |
| CN | 100529340 C | 8/2009 |
| CN | 102844533 A | 12/2012 |
| CN | 103147829 A | 6/2013 |
| CN | 104126060 A | 10/2014 |
| CN | 104343560 A | 2/2015 |
| CN | 104727915 A | 6/2015 |
| CN | 104797801 A | 7/2015 |
| CN | 105683549 A | 6/2016 |
| EP | 1777384 A1 | 4/2007 |
| EP | 2617972 A1 | 7/2013 |
| EP | 3020937 A1 | 5/2016 |
| EP | 2 921 682 B1 | 5/2019 |
| FR | 2999648 B1 | 12/2017 |
| JP | 2002-371893 A | 12/2002 |
| JP | 2003-090251 A | 3/2003 |
| JP | 2016-200110 A | 12/2016 |

OTHER PUBLICATIONS

Office Action issued in Chinese Patent Application No. 201880078627.5 dated Jun. 22, 2021.

* cited by examiner

SYSTEM AND METHOD FOR CONTROLLING AN INTERNAL COMBUSTION ENGINE PROVIDED WITH AN EXHAUST GAS POST-TREATMENT SYSTEM OF THE SELECTIVE CATALYSIS TYPE

BACKGROUND OF THE INVENTION

Field of the Invention

The invention concerns systems for controlling an internal combustion engine, and more particularly when the internal combustion engines are provided with an exhaust gas post-treatment system of the selective catalysis type.

Description of the Related Art

At present, the best compromise between polluting emissions of the type of unburned hydrocarbons HC, carbon monoxide CO, carbon dioxide $CO_2$, nitrogen oxides $NO_x$ and particulates is obtained during normal combustion mode by adjusting the combustion parameters such as the injection pattern, the exhaust gas recirculation rate EGR and the engine charge, expressed as flow or pressure. This compromise is obtained during stabilized tests.

The nitrogen oxide $NO_x$ emissions result from a given engine setting, and it is not possible to obtain a setpoint for the nitrogen oxide $NO_x$ emissions. Injection and air loop setpoints are determined which allow a given level of nitrogen oxide $NO_x$ emissions that is fixed for each operating point.

Legislation imposes a reduction in the emissions of nitrogen oxide $NO_x$. However, the reduction in such emissions is achieved at the cost of an increase in the emissions of carbon dioxide $CO_2$ and particulates.

The efficacy of the nitrogen oxide $NO_x$ post-treatment system of the selective catalysis SCR type depends on the temperature of the catalytic element, which must be higher than a threshold temperature, generally 280° C. Adapting the combustion to these efficacy criteria is fairly approximate and is characterized at stable points.

There is therefore a problem concerning the lack of optimization of the combustion settings, defined during stabilized tests, under transient conditions and it is not possible to control the engine with a setpoint of nitrogen oxide $NO_x$ emissions.

In the prior art, document JP2002371893 discloses controlling an internal combustion engine by controlling the nitrogen oxides $NO_x$ produced at the outlet from the engine.

However, the model used is particularly complex and hence costly in terms of calculation time, and does not take into account the efficacy of post-treatment of nitrogen oxides $NO_x$.

Document EP2617972 also describes a method for controlling the rate of exhaust gas recirculation EGR as a function of measurements from sensors for nitrogen oxides $NO_x$ in an open-loop control of the EGR.

SUMMARY OF THE INVENTION

The object of the invention is a system for controlling an internal combustion engine provided with an exhaust gas post-treatment system of the selective catalysis type, characterized in that it comprises a closed-loop control of nitrogen oxides upstream of the exhaust gas post-treatment system of the selective catalysis type, according to the following steps:

a means for determining a nitrogen oxide emission setpoint upstream of the exhaust gas post-treatment system as a function at least of the rotational speed and the torque setpoint of the internal combustion engine, a means for determining a value for the quantity of nitrogen oxides upstream of the exhaust gas post-treatment system, and a cascade control means which is able to determine an introduced oxygen setpoint and a charging pressure correction destined for the air loop control means of the internal combustion engine, and a fuel injection pressure correction and a start of injection correction destined for the injection control means of the internal combustion engine, as a function of a difference in nitrogen oxide emissions between a nitrogen oxide emission setpoint or corrected nitrogen oxide emission setpoint upstream of the exhaust gas post-treatment system, and a determined value of the nitrogen oxide quantity upstream of the exhaust gas post-treatment system.

The means for determining a nitrogen oxide setpoint upstream of the exhaust gas post-treatment system may comprise a three-dimensional map linking the torque setpoint, the setpoint for the nitrogen oxide emissions which can be treated by the post-treatment, and the rotational speed of the internal combustion engine.

The system may comprise a summing integrator able to determine a corrected setpoint for nitrogen oxide emissions upstream of the exhaust gas post-treatment system by adding the nitrogen oxide emission setpoint received from the map to a first correction produced by a map as a function of the temperature of the air introduced into the internal combustion engine, and/or to a second correction produced by a map as a function of the temperature of the cooling liquid of the internal combustion engine.

The means for determining a value for the nitrogen oxide quantity upstream of the exhaust gas post-treatment system may comprise at least a model of the quantity of nitrogen oxides at the level of the exhaust manifold of the engine as a function of at least one operating parameter of the engine and as a function of an introduced oxygen quantity value and of a charging pressure value provided by the air loop control means, and of a fuel injection pressure value and a start of injection value provided by the injection control means.

The means for determining a value of the nitrogen oxide quantity upstream of the exhaust gas post-treatment system may comprise at least a first map of the nitrogen oxide concentration as a function of at least one cylinder pressure measurement supplied by a cylinder pressure sensor.

The means for determining a value of the nitrogen oxide quantity upstream of the exhaust gas post-treatment system may comprise at least a second map of the nitrogen oxide concentration as a function of at least the total quantity of fuel injected into the cylinders, which is determined as a function of the values supplied by the engine electronic control unit.

The means for determining a value of the nitrogen oxide quantity upstream of the exhaust gas post-treatment system may be connected to a nitrogen oxide sensor situated in the exhaust line.

The means for determining a value of the nitrogen oxide quantity upstream of the exhaust gas post-treatment system may comprise at least one means for correcting the nitrogen oxide quantity value determined by one of the first map or the second map.

The cascade control means may comprise a means for determining an introduced oxygen setpoint, an injection correction means, a charging pressure correction means, a proportional-integral-derivative corrector able to determine a first control value as a function of the difference in nitrogen oxide emissions, and a first saturation means able to determine a control value saturated as a function of the oxygen, a function of the first control value and maximum and minimum limits, a function of the introduced oxygen quantity, and to emit a first control signal when the first control value is saturated, the means for determining an introduced oxygen setpoint may comprise a means for determining a target introduced oxygen setpoint, a first multiplier able to determine a correction of the introduced oxygen setpoint as a function of the control value saturated as a function of the oxygen, and a factor linked to the introduced oxygen setpoint stored in a first memory, and a summing integrator able to determine an introduced oxygen setpoint by adding a target introduced oxygen setpoint and the correction to the introduced oxygen setpoint.

The injection correction means may comprise an activation means able to activate the injection correction means when the first control signal is received, a calculation means able to determine a second control value as a function of the first control value and the control value saturated as a function of the oxygen, a second saturation means able to determine a second control value saturated as a function of the second control value and maximum and minimum limits, and able to emit a second control signal when the second control value is saturated, a second multiplier able to determine a correction of the fuel pressure in the injector supply rail as a function of the second saturated control value and a factor linked to the fuel pressure, a third multiplier able to determine a correction of the start of injection as a function of the second control value and a factor linked to the start of injection, the charging pressure correction means comprises a means for activating the charging pressure correction means when a second control signal is received, a calculation means able to determine a third control value as a function of the second control value and the second saturated control value, and a fourth multiplier able to determine a charging pressure correction as a function of the third control value and a factor linked to the charging pressure.

The injection correction means may comprise an activation means able to activate the injection correction means when the first control signal is received, a calculation means able to determine a second control value as a function of the first control value and the control value saturated as a function of the oxygen, a third saturation means able to determine a second control value saturated as a function of the fuel pressure in the injector supply rail, as a function of the second control value and a maximum limit value and a minimum limit value linked to the fuel pressure in the injector supply rail, and able to emit a third control signal when the second control value is saturated, a second multiplier able to determine a correction of the fuel pressure in the injector supply rail as a function of the second control value saturated as a function of the fuel pressure in the injector supply rail and a factor linked to the fuel pressure, a fourth saturation means able to determine a second control value saturated as a function of the start of injection, as a function of the second control value and a maximum limit value and a minimum limit value linked to the start of injection, and able to emit a fourth control signal when the second control value is saturated, a third multiplier able to determine a correction of the start of injection as a function of the second control value saturated as a function of the start of injection and a factor linked to the start of injection, an OR logic operator able to emit a second control signal when the third control signal or the one fourth control signal is received, the charging pressure correction means comprises a means for activating the charging pressure correction means when a second control signal is received, a calculation means able to determine a third control value as a function of the second control value, of the second control value saturated as a function of the fuel pressure in the injector supply rail, and of the second control value saturated as a function of the start of injection, a fourth multiplier able to determine a charging pressure correction as a function of the third control value and a factor linked to the charging pressure.

The cascade control means may comprise a means for determining an introduced oxygen setpoint, an injection correction means, a charging pressure correction means, a proportional-integral-derivative corrector able to determine a first control value as a function of the difference in nitrogen oxide emissions, and the means for determining an introduced oxygen setpoint comprises a means for determining a target introduced oxygen setpoint, a first multiplier able to determine a correction to the introduced oxygen setpoint as a function of the first control value and a factor linked to the introduced oxygen setpoint stored in a first memory, a first saturation means able to determine an introduced oxygen setpoint correction value that is saturated as a function of the introduced oxygen setpoint correction and maximum and minimum limits and as a function of the introduced oxygen setpoint, and to emit a first control signal when the introduced oxygen setpoint correction is saturated, and a summing integrator able to determine an introduced oxygen setpoint by adding a target introduced oxygen setpoint to the saturated value of the introduced oxygen setpoint correction.

The injection correction means may comprise an activation means able to activate the injection correction means when the first control signal is received, a calculation means able to determine a second control value as a function of the first control value, the saturated value of the introduced oxygen setpoint correction, and the factor linked to the introduced oxygen setpoint, a second multiplier able to determine a correction of the fuel pressure in the injector supply rail as a function of the second control value and a factor linked to the fuel pressure, a third saturation means able to determine a correction value of the fuel pressure in the injector supply rail that is saturated as a function of the correction of the fuel pressure in the injector supply rail, and a maximum limit value and minimum limit value linked to the fuel pressure in the injector supply rail, and able to emit a third control signal when the correction of the fuel pressure in the injector supply rail is saturated, a third multiplier able to determine a correction of the start of injection as a function of the second control value and a factor linked to the start of injection, a fourth saturation means able to determine a saturated value of the start of injection correction as a function of the start of injection correction and a maximum limit value and a minimum limit value linked to the start of injection, and able to emit a fourth control signal when the start of injection correction is saturated, an OR logic operator able to emit a second control signal when the third control signal or the one fourth control signal is received, the charging pressure correction means comprises a means 8a for activating the charging pressure correction means when a second control signal is received, a calculation means able to determine a third control value as a function of the second control value, the saturated correction value of the fuel pressure in the injector supply rail, the factor linked to the fuel pressure, the saturated value of the start of injection correction, and the factor linked to the start of injection, a fourth multiplier able to determine a charging pressure correction as a function of the third control value and a factor linked to the charging pressure.

The means for determining a target introduced oxygen setpoint may comprise a means for determining the presence of a cylinder pressure sensor, a means for determining the cylinder temperature, and a means for calculating the target introduced oxygen setpoint, the means for determining the presence of a cylinder pressure sensor is able to emit a signal destined for the means for determining a target introduced oxygen setpoint, indicating the absence of a cylinder pressure sensor when no signal is received or if a value outside a permitted range is received at the input, the means for determining the presence of a cylinder pressure sensor is able to transmit the value received to the means for determining the cylinder temperature, and to emit a signal destined for the means for determining a target introduced oxygen setpoint indicating the presence of a cylinder pressure sensor when a value within a permitted range is received at the input, the means for determining the cylinder temperature is able to determine the cylinder temperature as a function of a model, the cylinder pressure, the charge and the crankshaft position, the means for calculating the target introduced oxygen setpoint is able to determine the target introduced oxygen setpoint as a function of an inverted model of the nitrogen oxide emissions, the maximum temperature reached in the cylinder and the nitrogen oxide emission setpoint or corrected nitrogen oxide emission setpoint, if a cylinder pressure sensor is present, the means for calculating the target introduced oxygen setpoint is able to determine the target introduced oxygen setpoint as a function of an inverted model of the nitrogen oxide emissions, the total quantity of fuel injected into the cylinders and the nitrogen oxide emission setpoint or corrected nitrogen oxide emission setpoint, if a cylinder pressure sensor is not present.

The invention also concerns a method for controlling an internal combustion engine provided with an exhaust gas post-treatment system of the selective catalysis type, as a function of the setpoint of nitrogen oxide emissions upstream of the exhaust gas post-treatment system, characterized it comprises a closed-loop control of nitrogen oxides upstream of the exhaust gas post-treatment system of the selective catalysis type, according to the following steps during which:

a nitrogen oxide emission setpoint is determined upstream of the exhaust gas post-treatment system as a function at least of the rotational speed and the torque setpoint of the internal combustion engine, a value for the nitrogen oxide quantity upstream of the exhaust gas post-treatment system is determined, and an introduced oxygen setpoint is determined together with a charging pressure correction destined for air loop control means of the internal combustion engine, and a fuel injection pressure correction and a start of injection correction destined for the injection control means of the internal combustion engine, by cascade determination as a function of a difference in nitrogen oxide emissions between the nitrogen oxide emission setpoint or corrected nitrogen oxide emission setpoint upstream of the exhaust gas post-treatment system and the determined value of the nitrogen oxide quantity upstream of the exhaust gas post-treatment system.

The method has the advantage of taking into account the efficacy of the post-treatment SCR system, which leads to optimization of the control by setpoints of nitrogen oxides $NO_x$ leaving the engine so as to maintain an approximately constant rate of nitrogen oxide $NO_x$ emissions.

BRIEF DESCRIPTION OF THE DRAWINGS

Other objects, features and advantages of the invention will become apparent on reading the following description, given solely by way of nonlimiting example, and with reference to the appended drawings, in which.

DESCRIPTION OF THE PREFERRED EMBODIMENTS

The invention proposes to solve the technical problem by controlling the actuators of the internal combustion engine, such as in particular the fuel injectors, the air loop elements, the partial exhaust gas recirculation EGR valve and the turbo-compressor, by using a predictive and invertible model of nitrogen oxide $NO_x$ emissions in order to achieve a target concentration. In a particular embodiment, the model may take account of a measurement from a pressure sensor in the cylinder and/or a nitrogen oxide $NO_x$ sensor situated in the exhaust line.

The nitrogen oxide $NO_x$ emission model shows the effects of the main contributors in the creation of nitrogen oxides $NO_x$, these being the introduced oxygen, the cylinder temperature, the injection pressure, the combustion phase and the engine filling.

The model allows open-loop control of the nitrogen oxide $NO_x$ emissions by determining the quantity of oxygen necessary at the intake as a function of the desired nitrogen oxide $NO_x$ emissions and the total injected fuel mass. In particular embodiments, when a cylinder pressure sensor is present, the model takes account of a cylinder temperature measurement instead of the total injected fuel mass.

A PID controller (proportional, integral, derivative) is added for closed-loop control via secondary parameters of the start of injection SOI and the fuel pressure in the rail.

These two parameters affect the combustion noise and must therefore be controlled simultaneously in order to limit the impact of the method on the perceived combustion noise.

Figure 1:
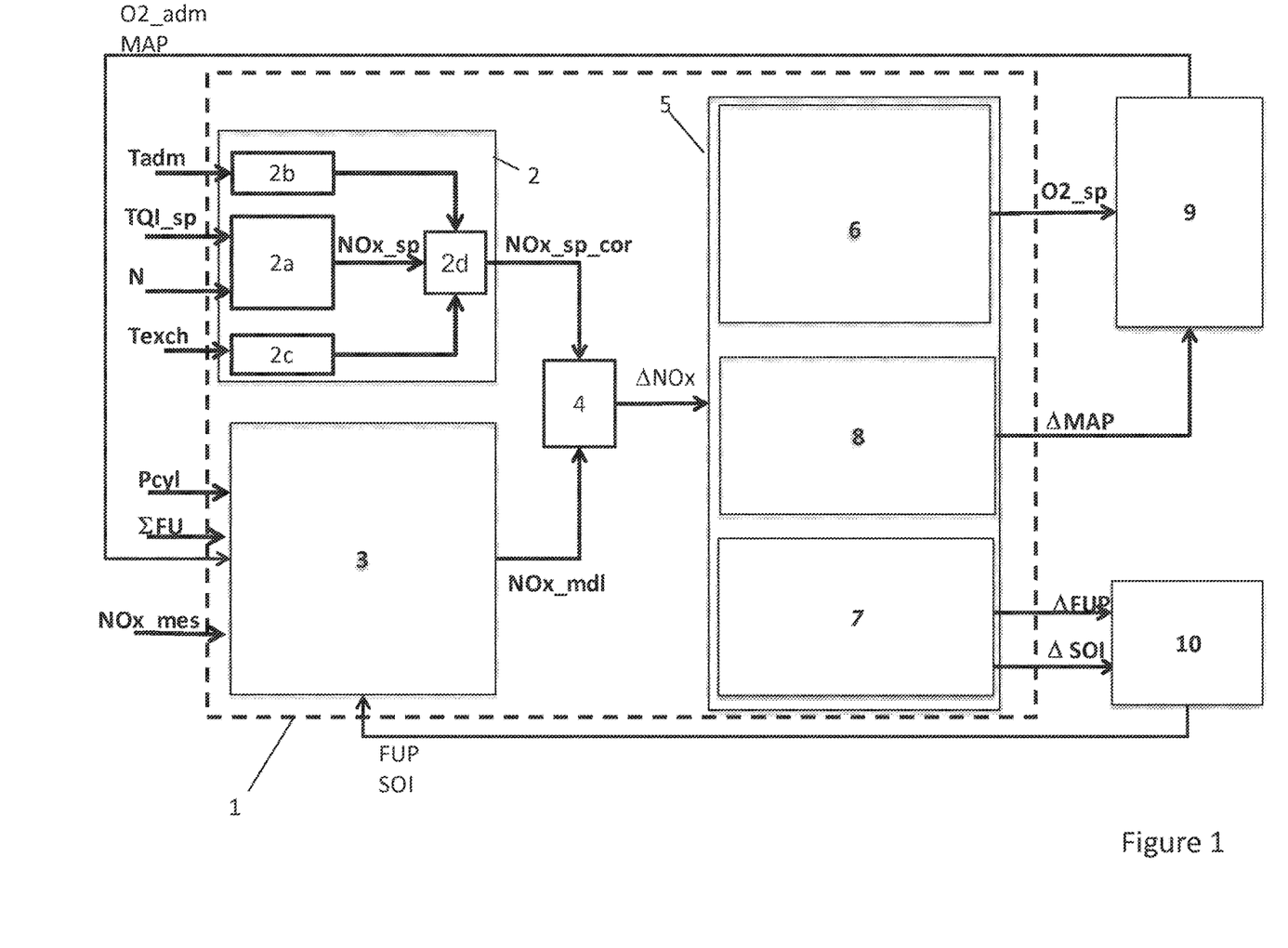
FIG. 1 illustrates the main elements of a control system of an internal combustion engine according to the invention.

FIG. 1 shows a control system 1 of an internal combustion engine as a function of a nitrogen oxide $NO_x$ emission setpoint, via determination of an introduced oxygen setpoint and a charging pressure correction destined for the air loop control means 9, and via a fuel injection pressure correction destined for the injection control means 10.

The control system 1 comprises a means 2 for determining a nitrogen oxide $NO_x$ emission setpoint, a means 3 for determining a value of a nitrogen oxide $NO_x$ quantity, and a cascade control means 5.

More precisely, the means 2 for determining a nitrogen oxide $NO_x$ emission setpoint comprises a three-dimensional map 2a linking the torque setpoint TQI_sp, the efficacy of post-treatment SCR, and the rotational speed N of the internal combustion engine. In the present case, the three-dimensional map 2a allows determination of the post-treatment efficacy as a function of the torque setpoint TQI_sp and of the rotational speed N of the engine, in the form of a setpoint, marked NOx_sp, for nitrogen oxide $NO_x$ emissions which can be treated by the post-treatment SCR.

In a particular embodiment, the nitrogen oxide emission setpoint NOx_sp produced by the three-dimensional map 2a is corrected at the output as a function of measurement of the introduced air temperature and/or as a function of the engine cooling liquid temperature.

To achieve this, the output of the map 2a is linked to a summing integrator 2d receiving a first correction produced by a map 2b as a function of the introduced air temperature Tadm, and/or a second correction produced by a map 2c as a function of the cooling liquid temperature Texch. The corrected nitrogen oxide emission setpoint NOx_sp_cor is then substituted for the nitrogen oxide emission setpoint NOx_sp at the output from the means 2 for determining a nitrogen oxide $NO_x$ emission setpoint.

The means 3 for determining a value of the nitrogen oxide quantity comprises at least one model of the nitrogen oxide quantity at the level of the engine exhaust manifold.

The model of the nitrogen oxide quantity may be model as disclosed in application FR2999648, allowing determination of the nitrogen oxide concentration as a function at least of the pressure in each cylinder.

The model of the nitrogen oxide quantity may also be a model which is a function at least of the total fuel quantity injected into the cylinders.

Figure 6:
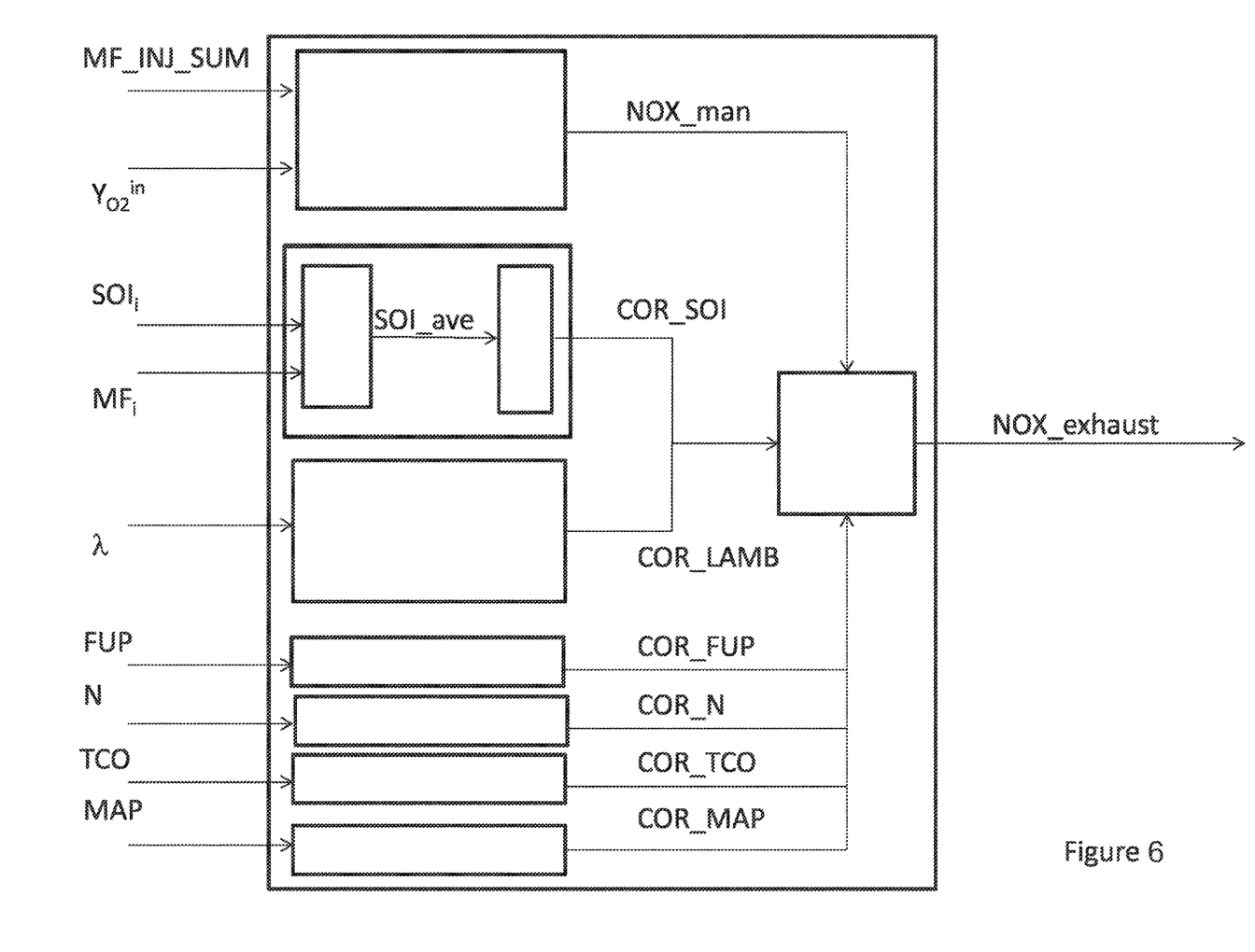
FIG. 6 shows a diagram for determining the concentration of nitrogen oxides leaving the engine.

Such a model, produced in particular within a system for estimating the nitrogen oxide concentrations at the outlet from the engine, will now be described with the aid of FIG. 6. The engine outlet means the outlet of exhaust gases at the level of the exhaust manifold before any treatment by antipollution systems or before extraction of part of the gas through a partial exhaust gas recirculation system.

The estimation system comprises a first means for estimating the nitrogen oxide quantity NOX_man in the exhaust gases as a function of the total injected fuel mass MF_INJ_SUM and the introduced oxygen quantity $Y_{O2}^{in}$. The first estimation means may be a map or a physical model.

The total injected fuel mass MF_INJ_SUM is equal to the sum of the fuel quantities injected during the preceding combustion cycle. This information may be transmitted by the vehicle's electronic control unit or by the injection control means.

The introduced oxygen quantity $Y_{O2}^{in}$ is determined upstream of the intake valve via a model produced by a calculation means or via an oxygen sensor arranged at the intake.

The estimation system comprises a means for estimating a correction COR_SOI as a function of the mean instant of start of injection. A calculation means determines the mean instant of start of injection SOI_ave as a function of the start of injection instants $SOI_i$ and the injected fuel masses $MF_i$ for each injection during the preceding combustion cycle, by applying the following equation:

$$SOI\_ave = \frac{\sum_{i=1}^{i=n\_inj} MF_i \cdot SOI_i}{\sum_{i=1}^{i=n\_inj} MF_i} \quad \text{(Eq. 1)}$$

The calculation means thus determines the mean instant of start of injection SOI_ave as the sum, over all injections of the past combustion cycle, of the product of the start of injection instant $SOI_i$ by the injected fuel mass $MF_i$ divided by the sum, over all injections of the preceding combustion cycle, of the injected fuel mass $MF_i$.

In other words, the calculation means determines the image of the combustion centre by averaging the start of injection instants weighted by the fuel mass injected on each injection.

A second determination means allows determination of the first correction COR_SOI of the nitrogen oxide quantity as a function of the mean start of injection instant SOI_ave as explained above.

A third determination means allows determination of a second correction COR_LAMB of the nitrogen oxide quantity as a function of a measurement of richness at the exhaust.

A set of determination means allows determination of a nitrogen oxide quantity correction COR_FUP as a function of the fuel pressure FUP at injection, a nitrogen oxide quantity correction COR_TCO as a function of the cooling liquid temperature TCO, a nitrogen oxide quantity correction COR_MAP as a function of the charging pressure MAP, and a nitrogen oxide quantity correction COR_N as a function of the rotational speed N of the internal combustion engine.

Each means of the set of determination means may be a map or a model.

A second calculation means allows determination of a corrected quantity of nitrogen oxides in the exhaust gas NOX_exhaust at the level of the exhaust manifold, by forming the product of the estimated nitrogen oxide quantity NOX_man by the various corrections, if these are expressed relative to the estimated nitrogen oxide quantity. Alternatively, the second calculation means determines a corrected quantity of nitrogen oxides in the exhaust gas NOX_exhaust at the level of the exhaust manifold, by forming the sum of the estimated nitrogen oxide quantity NOX_man and the various corrections, if these are expressed in the form of a nitrogen oxide quantity.

The method of determining a corrected quantity of nitrogen oxides in the exhaust gas of an internal combustion engine at the level of the exhaust manifold comprises a first step during which the nitrogen oxide quantity is estimated as a function of the total injected fuel mass and the introduced oxygen quantity.

The introduced oxygen quantity is determined upstream of the intake valve by a physical model or by an oxygen sensor arranged at the intake.

The total injected fuel mass is equal to the sum of all fuel injections during the combustion cycle.

Then at least one correction of the nitrogen oxide quantity is determined as a function of at least one parameter measurement or operating variable of the internal combustion engine, then a corrected quantity of nitrogen oxides in the exhaust gas is determined as a function of the estimated nitrogen oxide quantity and the corrections.

A first nitrogen oxide quantity correction depends on the mean instant of start of injection. The mean instant of start of injection is determined as the sum, over all injections of the preceding combustion cycle, of the product of the start of injection instant by the injected fuel mass divided by the sum, over all injections of the preceding combustion cycle, of the injected fuel mass.

A first nitrogen oxide quantity correction is determined as a function of the mean instant of start of injection, either by modelling or by mapping.

A second nitrogen oxide quantity correction is determined as a function of a measurement of the richness at the exhaust by an oxygen sensor, either by modelling or by mapping.

Further nitrogen oxide quantity corrections may be determined, such as a nitrogen oxide quantity correction COR_FUP as a function of the fuel pressure FUP at injection, a nitrogen oxide quantity correction COR_TCO as a function of the cooling liquid temperature TCO, a nitrogen oxide quantity correction COR_MAP as a function of the charging pressure MAP, and a nitrogen oxide quantity correction COR_N as a function of the rotational speed N of the internal combustion engine. These corrections may also be determined by modelling or by mapping.

The person skilled in the art will also note that the system and the method of determination may be dimensioned to estimate both the nitrogen oxide quantity produced by engine as a whole, and the nitrogen oxide quantity produced by a cylinder, thus allowing adaptation to all engine configurations (different numbers of cylinders, selective disconnection of cylinders etc.) or refined control of the cylinders such an engine.

Once again, we refer to the control system 1 of an internal combustion engine as a function of a setpoint for emission of a nitrogen oxide NOx quantity.

The means 3 for determining a value of the nitrogen oxide quantity receives at the input an introduced air quantity value O2_adm and a charging pressure value MAP from the air loop control means 9, and a fuel injection pressure FUP and a start of injection value SOI produced by the injection control means 10.

The means 3 for determining a value for the nitrogen oxide quantity emits at the output a modelled nitrogen oxide emission value.

A subtracter 4 determines the difference between the corrected nitrogen oxide emission setpoint NOx_sp_cor and the determined value of the nitrogen oxide quantity NOx_mdl, and transmits the resulting nitrogen oxide emission difference ΔNOx to the cascade control means 5.

Figure 2:
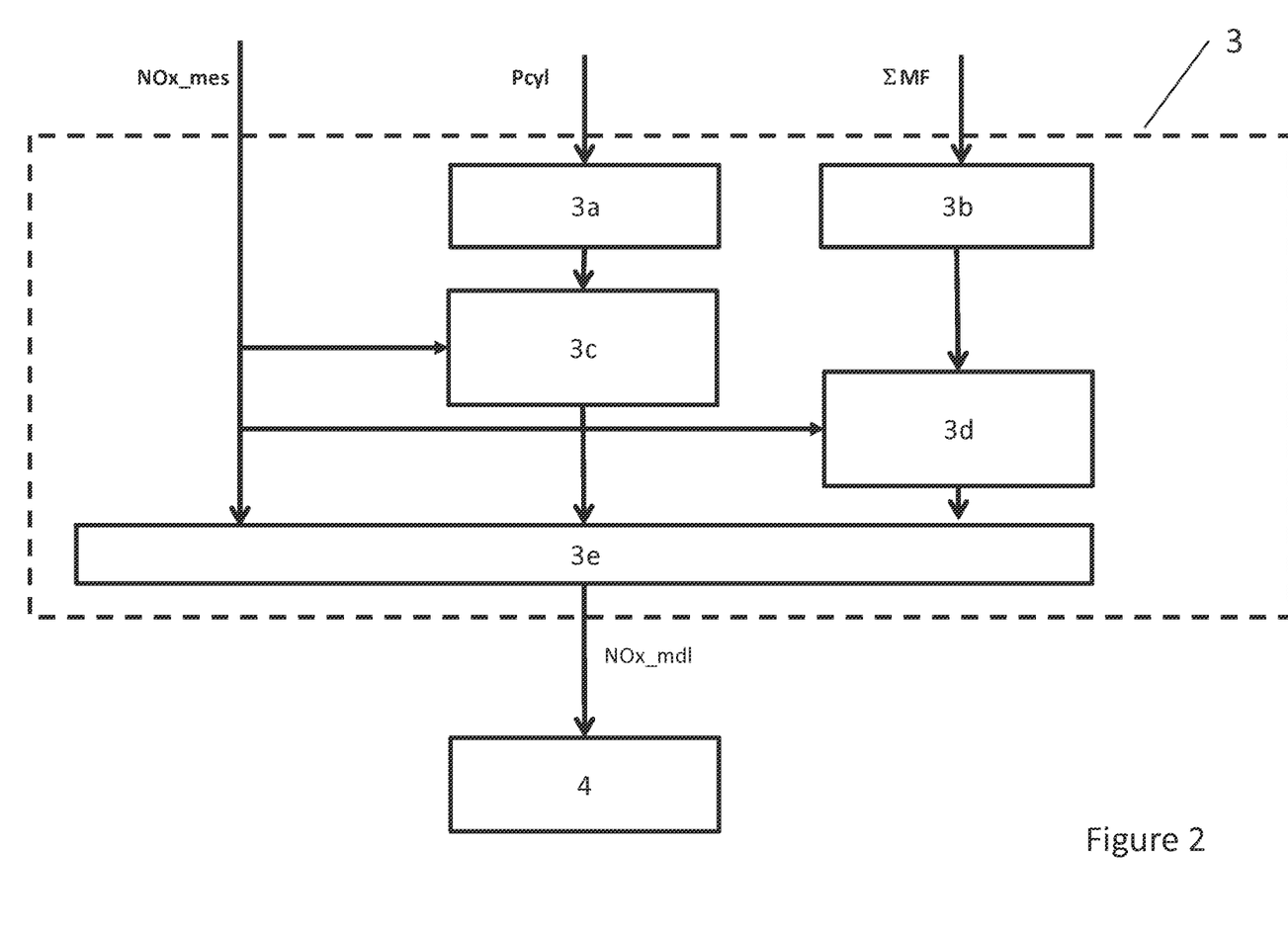
FIG. 2 illustrates the main elements of a means for determining a value of the nitrogen oxide quantity.

In a particular embodiment, the means 3 for determining a nitrogen oxide quantity value comprises at least the two models and means for determining the model to be used as a function of the measures available. Such an embodiment is illustrated by FIG. 2.

We can see that the means 3 for determining a value of the nitrogen oxide quantity comprises at least a first map 3a of the nitrogen oxide concentration as a function of at least the cylinder pressure measurement Pcyl produced by a cylinder pressure sensor, and a second map 3b of the nitrogen oxide concentration as a function at least of the total quantity of fuel injected into the cylinders ΣMF, which is determined as a function of the values supplied by the engine electronic control unit.

A selection means 3e determines the modelled value to be transmitted to the subtracter 4.

If the vehicle is equipped with a cylinder pressure sensor, the value determined by the first map 3a is transmitted to the subtracter 4, and the value determined by the second map 3b is not taken into account. If the vehicle is not equipped with a cylinder pressure sensor, the value determined by the first map 3a is not taken into account, and the value determined by the second map 3b is transmitted to the subtracter 4.

Alternatively, when the vehicle is also equipped with a nitrogen oxide sensor, each of the models forms the subject of a correction as a function of measurement of the nitrogen oxide quantity NOx_mes at the outlet from the engine, as measured by a nitrogen oxide sensor arranged in the exhaust line. To achieve this, a first correction means 3c corrects the value produced by the first map 3a as a function of the measurement of nitrogen oxide quantity at the outlet from the engine, and a second correction means 3d corrects the value produced by the second map 3b as a function of the same measurement of nitrogen oxide quantity at the outlet from the engine.

The selection means 3e determines the corrected value to be transmitted to the subtracter 4.

If the measured nitrogen oxide quantity NOx_mes is available but the cylinder pressure measurement and the fuel quantity injected into the cylinders are not available, the selection means 3e transmits the measured nitrogen oxide quantity NOx_mes.

If the cylinder pressure measurement is available but the measurement of the nitrogen oxide quantity NOx_mes and the quantity of fuel injected into the cylinder are not available, the selection means 3e transmits the value of the nitrogen oxide quantity that is determined as a function at least of the cylinder pressure measurement Pcyl produced by the first map 3a.

If the quantity of fuel injected into the cylinders is available but the measurement of the nitrogen oxide quantity NOx_mes and the cylinder pressure measurement are not available, the selection means 3e transmits the value of the nitrogen oxide quantity that is determined as a function at least of the total quantity of fuel injected into the cylinders produced by the second map 3b.

If the cylinder pressure measurement and the measurement of the nitrogen oxide quantity NOx_mes are available but the quantity of fuel injected into the cylinder is not available, the selection means 3e transmits the value of the nitrogen oxide quantity that is corrected as a function at least of the cylinder pressure measurement Pcyl produced by the first correction means 3c.

If the quantity of fuel injected into the cylinders and the measurement of the nitrogen oxide quantity NOx_mes are available but the cylinder pressure measurement is not available, the selection means 3e transmits the value of the nitrogen oxide quantity that is corrected as a function at least of the total quantity of fuel injected into the cylinders produced by the second correction means 3d.

With reference again to FIG. 1, we can see that the cascade control means 5 comprises a means 6 for determining an introduced oxygen setpoint, an injection correction means 7 and a charging pressure correction means 8.

Figure 3:
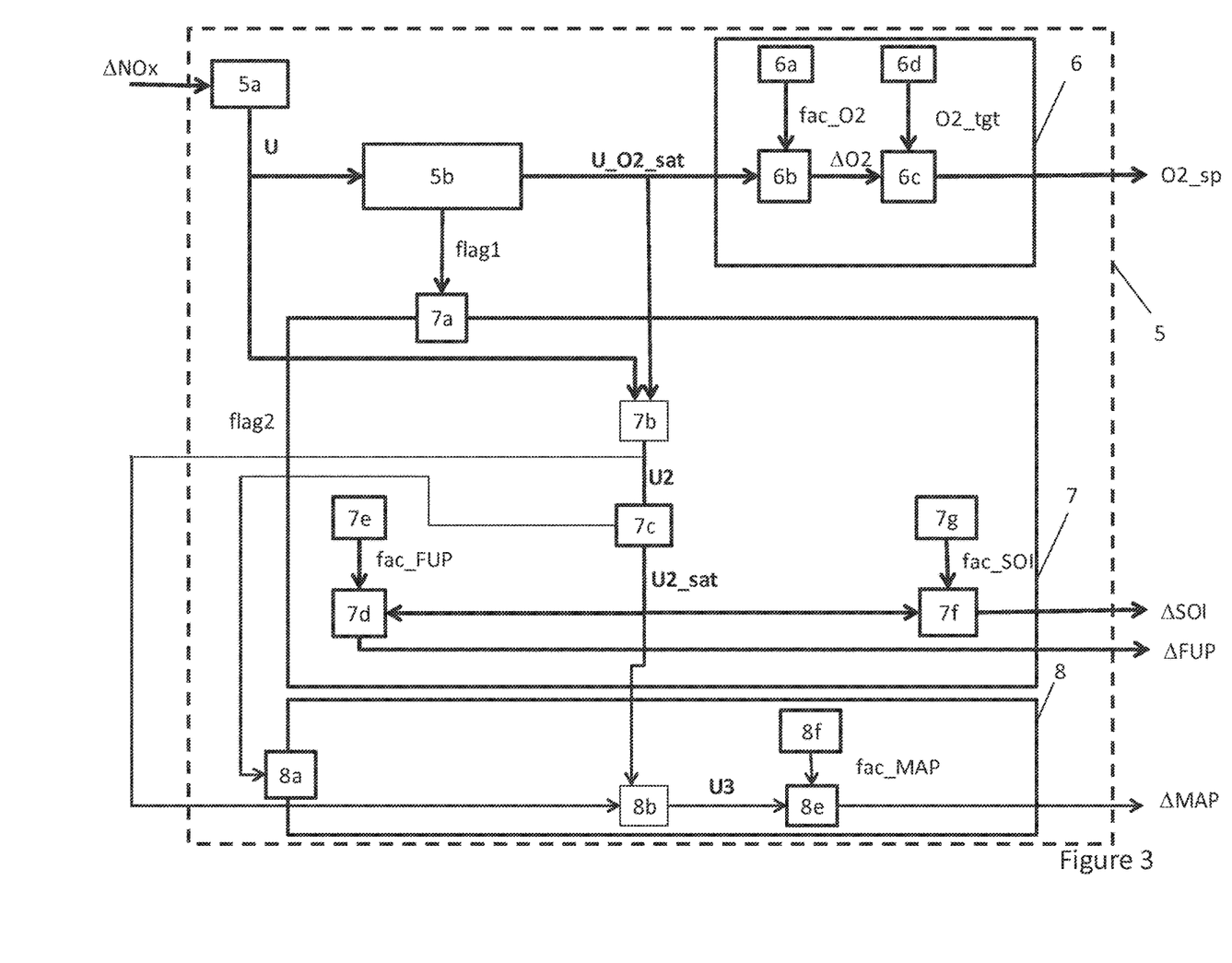
FIG. 3 illustrates the main elements of a cascade control means.

The means 6 for determining an introduced oxygen setpoint, the injection correction means 7 and the charging pressure correction means 8 function in cascade, as illustrated by FIG. 3.

This figure also shows that the difference in nitrogen oxide emissions ΔNOx determined by the subtracter 4 is received by a PID corrector (referenced 5a) which provides a first control value U at the output. In the present document, a control value is a value varying between −1 and +1 produced by a PID corrector.

The first control value U is received by first saturation means 5b able to limit the value when it exceeds maximum or minimum limits. The maximum limit of the control value and the minimum limit of the control value are determined by inverse application of the transfer function associated with control of the air loop, in particular with control of the introduced oxygen quantity.

The first saturation means 5b produces at the output a control value that is saturated as a function of the oxygen U_O2_sat and destined for the means 6 for determining an introduced oxygen setpoint.

The means 6 for determining an introduced oxygen setpoint comprises a means 6d for determining a target introduced oxygen setpoint, a first multiplier 6b able to determine a correction of the introduced oxygen setpoint ΔO2 as a function of the control value saturated as a function of the oxygen U_O2_sat, and a factor linked to the introduced oxygen setpoint fac_O2 stored in a first memory 6a, and a summing integrator 6c able to determine an introduced oxygen setpoint O2_sp by adding the target introduced oxygen setpoint O2_tgt and the correction to the introduced oxygen setpoint ΔO2.

When the first control value U is saturated because it is higher than the maximum limit or lower than the minimum limit, the first saturation means 5b emits a first control signal flag1, such as a Boolean operator, destined for a means 7a for activating the injection correction means 7, such that the injection correction means 7 is only active if the first control value U has been saturated by the first saturation means 5b.

The injection correction means 7 comprises a calculation means 7b receiving at the input the first control value U and the control value saturated as a function of the oxygen U_O2_sat, and determining a second control value U2 by application of the following equation:

$$U2 = (U - U\_O2\_sat)/2 \quad \text{(Eq. 2)}$$

The second control value U2 is received by a second saturation means 7c able to limit the value when it exceeds maximum or minimum limits.

The second saturation means 7c emits at the output a second saturated control value U2_sat.

A second multiplier 7d receives the second saturated control value U2_sat and a factor linked to fuel pressure fac_FUP from a second memory 7e, and at the output emits a correction to the fuel pressure in the injector supply rail ΔFUP. A factor here is a parameter to be adjusted either by calibration on the test bench or as a function of a map linked to the rotational speed of the engine and/or the engine torque.

A third multiplier 7f also receives the second control value U2 and a factor linked to the start of injection fac_SOI from a third memory 7g, and emits at the output a correction of the start of injection ΔSOI.

Figure 5:
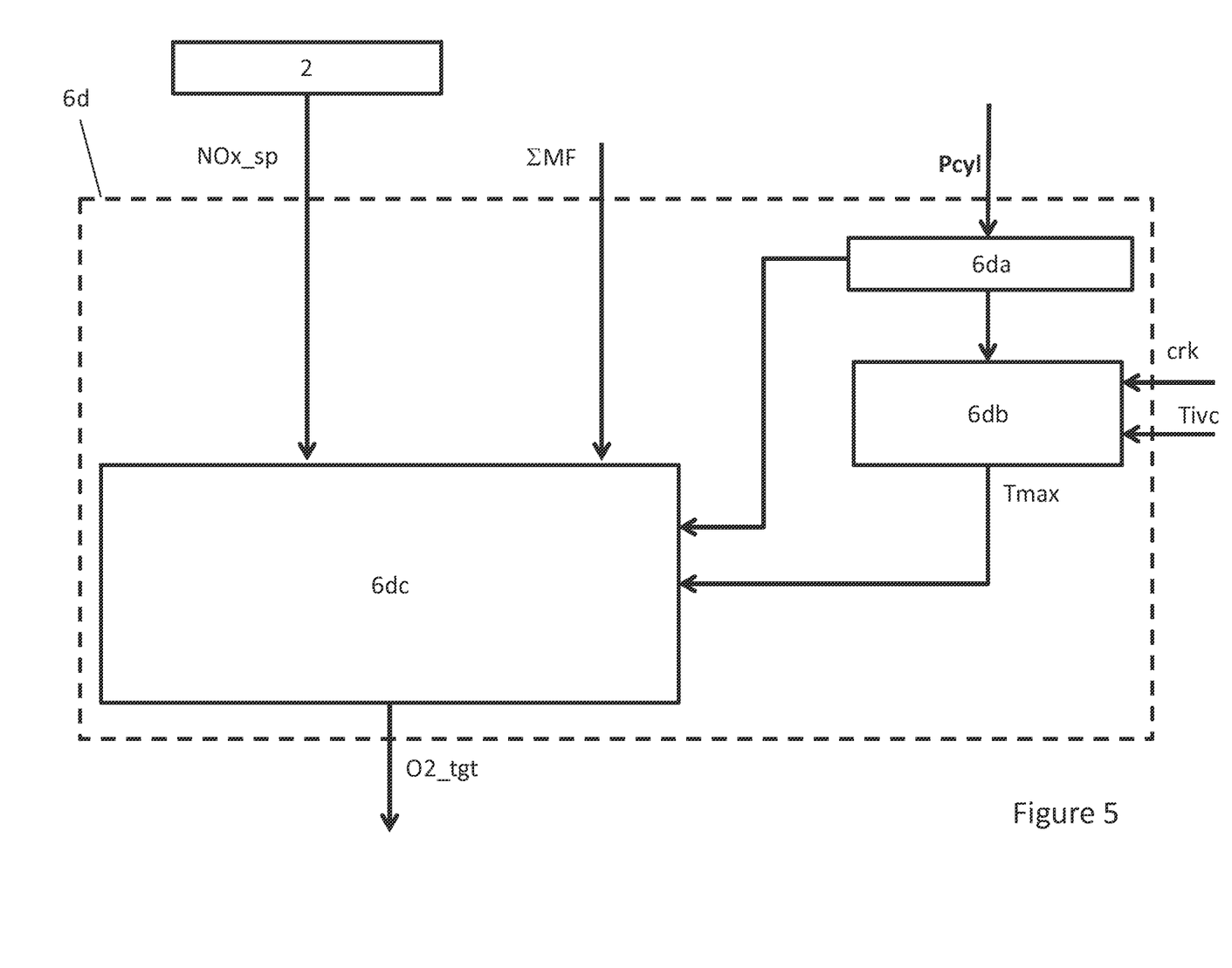
FIG. 5 illustrates the main elements of a means for determining a target introduced oxygen setpoint.

With reference to FIG. 5, we can see that the means 6d for determining a target introduced oxygen setpoint comprises a means 6da for determining the presence of a cylinder pressure sensor, a means 6db for determining the cylinder temperature, and a means 6dc for calculating the target introduced oxygen setpoint.

The means 6da for determining the presence of a cylinder pressure sensor determines the presence of a cylinder pressure sensor as a function of the signal received at the input.

If no signal is received or if a value outside a permitted range is received at the input, the means 6da for determining the presence of a cylinder pressure sensor emits a signal destined for the means for determining a target introduced oxygen setpoint O2_tgt, indicating the absence of a cylinder pressure sensor.

If a value lying within the permitted range is received at the input, the means 6da for determining the presence of a cylinder pressure sensor transmits the value to the means 6db for determining the cylinder temperature, and emits a signal destined for the means for determining a target introduced oxygen setpoint O2_tgt, indicating the presence of a cylinder pressure sensor.

The means 6db for determining the cylinder temperature receives the cylinder pressure measurement Pcyl and the crankshaft position during measurement crk and the temperature Tivc on closure of the intake valves.

The means 6db for determining the cylinder temperature applies a physical model of gas behaviour in the cylinder, namely of the type of perfect equation of gases, in order to determine a maximum temperature Tmax reached in the cylinder once the valves are closed.

The means 6dc for calculating the target introduced oxygen setpoint applies an inverted model of nitrogen oxide emission that is selected as a function of the presence of a cylinder pressure sensor.

If a cylinder pressure sensor is present, it determines the target introduced oxygen setpoint O2_tgt as a function of a map depending on the maximum temperature Tmax achieved in the cylinder and on the nitrogen oxide emission setpoint NOx_sp.

If a cylinder pressure sensor is not present, it determines the target introduced oxygen setpoint O2_tgt as a function of a map depending on the total fuel quantity injected into the cylinders ΣMF and on the nitrogen oxide emission setpoint NOx_sp.

In a particular embodiment, the means 6dc for calculating the target introduced oxygen setpoint receives and uses the corrected nitrogen oxide emission setpoint NOx_sp_cor instead of the nitrogen oxide emission setpoint NOx_sp, when the nitrogen oxide emission setpoint NOx_sp is corrected as a function of the introduced air temperature Tadm or the cooling liquid temperature Texch in the means 2 for determining a nitrogen oxide emission setpoint NOx.

With reference again to FIG. 3, we see that the charging pressure correction means 8 receives at the input the second control value U2 and the saturated second control value U2_sat, and emits at the output a charging pressure correction ΔMAP destined for the air loop control means 9.

When the second control value U2 is saturated because it is higher than the maximum limit or lower than the minimum limit, the second saturation means 7c emits a second control signal flag2, such as a Boolean operator, destined for a means 8a for activating the charging pressure correction means 8, such that the charging pressure correction means 8 is only active if the first control value U has been saturated by the second saturation means 7c.

The charging pressure correction means 8 comprises a calculation means 8b receiving at the input the second control value U2 and the second saturated control value U2_sat, and determining a third control value U3 by application of the following equation:

$$U3 = 2*(U2 - U2\_sat) \quad (Eq.3)$$

A fourth multiplier 8e receives the third control value U3 and a factor linked to charging pressure fac_MAP from a fourth memory 8f, and at the output emits a charging pressure correction ΔMAP.

Figure 4:
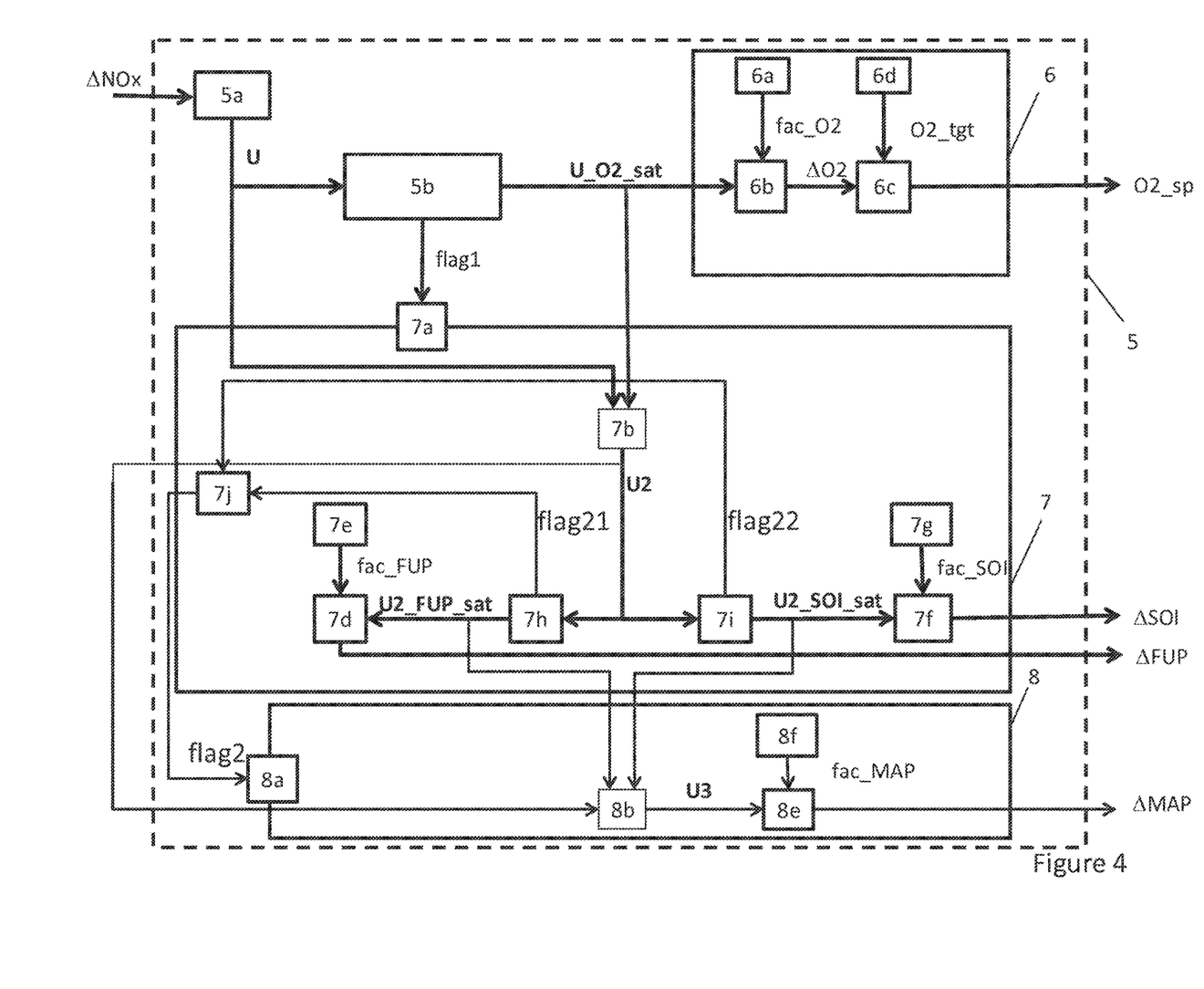
FIG. 4 illustrates the main elements of another embodiment of the cascade control means.

In an alternative embodiment illustrated by FIG. 4, the calculation means 7b emits a second control value destined for a third saturation means 7h and a fourth saturation means 7i.

The third saturation means 7h is arranged between the second calculation means 7b and the second multiplier 7d, and determines a saturated control value U2_FUP_sat corresponding to the values taken by the second control value which are limited between a maximum limit value and a minimum limit value linked to the fuel pressure in the injector supply rail. The saturated control value U2_FUP_sat is then transmitted to the second multiplier 7d.

The fourth saturation means 7i is arranged between the calculation means 7b and the third multiplier 7f, and determines a saturated control value U2_SOI_sat corresponding to the values taken by the second control value U2 which are limited between a maximum limit value and a minimum limit value linked to the start of injection. The saturated control value U2_SOI_sat is then transmitted to the third multiplier 7f.

When the second control value U2 is saturated because it is higher than the maximum limit or lower than the minimum limit, the third saturation means 7h emits a third control signal flag21, such as a Boolean operator, destined for an OR logic operator referenced 7j.

When the second control value U2 is saturated because it is higher than the maximum limit or lower than the minimum limit, the fourth saturation means 7i emits a fourth control signal flag22, such as a Boolean operator, destined for an OR logic operator referenced 7j.

The OR logic operator referenced 7j emits a second control signal flag2 destined for the means 8a for activating the charging pressure correction means 8, such that the charging pressure correction means 8 is active only if the second control value U2 has been saturated by the third saturation means 7h or the fourth saturation means 7i.

The charging pressure correction means 8 comprises a calculation means 8b receiving at the input the second control value U2, the second control value saturated as a function of the fuel pressure in the injector supply rail U2_FUP_sat, and the second control value saturated as a function of the start of injection U2_SOI_sat, and determining a third control value U3 by application of the following equation:

$$U3 = 2*U2 - U2\_FUP\_sat - U2\_SOI\_sat \quad (Eq. 4)$$

The other elements of the cascade control means 5 correspond to the elements described with respect to FIG. 3.

In an alternative embodiment applying to both the embodiment illustrated by FIG. 3 and the embodiment illustrated by FIG. 4, the control values are converted into control signals by multiplication of a control value by a predetermined factor before performing saturation. Thus each saturation applies to a control signal instead of a control value. This embodiment has the advantage of easier parameterization due to the application of saturation to control signals similar to physical values.

With reference again to FIG. 1, independently of the embodiment of the cascade control means 5, the air loop control means 9 receive at the input the introduced oxygen setpoint O2_sp and the charging pressure correction ΔMAP. The air loop control means 9 determines a corrected setpoint for the charging pressure MAP_sp_cor, equal to the sum of the charging pressure set point MAP_sp received from the electronic control unit and the charging pressure correction ΔMAP.

The air loop control means 9 determines and transmits suitable commands to the fresh air intake actuators as a function of the introduced oxygen setpoint O2_sp, and commands to the actuators of the charging turbo-compressor as a function of the corrected charging pressure set point MAP_sp_cor.

The injection control means 10 receives at the input the correction to the fuel pressure of the injector supply rail ΔFUP and the correction to the start of injection ΔSOI. The injection control means 10 determines a corrected setpoint for the fuel pressure in the injector supply rail FUP_sp_cor by adding the setpoint of the fuel pressure in the injector supply rail FUP_sp received from the engine electronic control unit and the correction of the fuel pressure in the injector supply rail ΔFUP.

The injection control means 10 also determines a corrected setpoint for the start of injection SOI_sp_cor by adding the setpoint of the start of injection SOI_sp received from the engine electronic control unit and the correction of the start of injection ΔSOI.

The air loop control means 9 determines and transmits suitable commands to the fuel injector actuators as a function of the corrected setpoint of the start of injection SOI_sp_cor and the corrected setpoint of the fuel pressure in the injector supply rail FUP_sp_cor.

The invention claimed is:

1. A system for controlling an internal combustion engine provided with a selective catalysis exhaust gas post-treatment system, the system comprising:
one or more processors configured to provide a closed-loop control of nitrogen oxides upstream of the selective catalysis exhaust gas post-treatment system by:
determining a nitrogen oxide emission setpoint upstream of the selective catalysis exhaust gas post-treatment system as a function of at least a rotational speed and a torque setpoint of the internal combustion engine,
determining a quantity value for the nitrogen oxides upstream of the selective catalysis exhaust gas post-treatment system, and
determining, by a cascade controller, an introduced oxygen setpoint of oxygen and a charging pressure correction for an air loop controller of the internal combustion engine, and a fuel injection pressure correction and a start of injection correction for an injection controller of the internal combustion engine, as a function of a difference between the nitrogen oxide emission setpoint or a corrected nitrogen oxide emission setpoint upstream of the selective catalysis exhaust gas post-treatment system, and the determined quantity value of the nitrogen oxides upstream of the selective catalysis exhaust gas post-treatment system, wherein the quantity value for the nitrogen oxides is determined based on an introduced oxygen quantity value and a charging pressure value provided by the air loop controller, and a fuel injection pressure value and a start of injection value provided by the injection controller.

2. The control system as claimed in claim 1, wherein the one or more processors utilizes at least a model of the quantity of nitrogen oxides at a level of an exhaust manifold of the engine as a function of
(i) at least one operating parameter of the engine,
(ii) an introduced oxygen quantity value provided by the air loop controller,
(iii) a charging pressure value provided by the air loop controller,
(iv) a fuel injection pressure value provided by the injection controller, and
(v) a start of injection value provided by the injection controller.

3. The control system as claimed in claim 1, wherein the one or more processors is connected to a nitrogen oxide sensor situated in an exhaust line of the internal combustion engine.

4. The control system as claimed in claim 1, wherein the cascade controller is configured to determine the introduced oxygen setpoint, the cascade controller comprising
an injection corrector,
a charging pressure corrector, and
a proportional-integral-derivative corrector to determine a first control value as a function of the difference in nitrogen oxide emissions,
the cascade controller being configured to determine a target introduced oxygen setpoint,
the cascade controller configured to
determine a correction to the introduced oxygen setpoint as a function of the first control value and a factor linked to the introduced oxygen setpoint stored in a first memory as the introduced oxygen setpoint correction,
determine an introduced oxygen setpoint correction value that is saturated as a function of the introduced oxygen setpoint correction, maximum and minimum limits, and the introduced oxygen setpoint, and to emit a first control signal when the introduced oxygen setpoint correction value is saturated, and
determine the introduced oxygen setpoint by adding a target introduced oxygen setpoint to the saturated introduced oxygen setpoint correction value.

5. The control system as claimed in claim 4, wherein the injection corrector comprises
a first activator to activate the injection corrector when the first control signal is received, and
a first calculator configured to determine a second control value as a function of the first control value, the saturated introduced oxygen setpoint correction value, and a factor linked to the introduced oxygen setpoint,
the injection corrector being configured to
determine a correction of the fuel pressure in the injector supply rail as a function of the second control value and a factor linked to the fuel pressure as the fuel injection pressure correction,
determine a saturated correction value of the fuel pressure in an injector supply rail that is saturated as a function of the fuel injection pressure correction in the injector supply rail, and a maximum limit value and minimum limit value linked to the fuel pressure in the injector supply rail, and configured to emit a third control signal when the fuel injection pressure correction in the injector supply rail is saturated,
determine a correction of the start of injection as a function of the second control value and a factor linked to the start of injection as the start of injection correction,
determine a saturated value of the start of injection correction as a function of the start of injection correction and a maximum limit value and a minimum limit value linked to the start of injection, and configured to emit a fourth control signal when the start of injection correction is saturated, and
emit a second control signal when the third control signal or the fourth control signal is received,
the charging pressure corrector comprising
a second activator configured to activate the charging pressure corrector when the second control signal is received,
a second calculator configured to determine a third control value as a function of the second control value, the saturated correction value of the fuel pressure in the injector supply rail, the factor linked to the fuel pressure, the saturated value of the start of injection correction, and the factor linked to the start of injection, and
a fourth multiplier configured to determine the charging pressure correction as a function of the third control value and a factor linked to the charging pressure.

6. The control system as claimed in claim 1, wherein the one or more processors determines the nitrogen oxide quantity value using at least a first map of a nitrogen oxide concentration as a function at least of a cylinder pressure measurement supplied by a cylinder pressure sensor.

7. The control system as claimed in claim 6, wherein the one or more processors determines the nitrogen oxide quantity value using at least a second map of the nitrogen oxide concentration as a function at least of a total quantity of fuel injected into cylinders of the internal combustion engine, which is determined as a function of the values supplied by an electronic control unit of the internal combustion engine.

8. The control system as claimed in claim 7, wherein the one or more processors is configured to correct the nitrogen oxide quantity value determined by one of the first map and the second map.

9. The control system as claimed in claim 1, wherein the cascade controller is configured to determine the introduced oxygen setpoint, the cascade controller comprising
an injection corrector,
a charging pressure corrector, and
a proportional-integral-derivative corrector configured to determine a first control value as a function of the nitrogen oxide emissions difference,
the cascade controller being configured to determine a first saturated control value saturated as a function of the oxygen, a function of the first control value and maximum and minimum limits, and a function of the introduced oxygen quantity, and emit a first control signal when the first control value is saturated, and determine a target introduced oxygen setpoint,
the cascade controller further configured to
determine a correction of the introduced oxygen setpoint as a function of the first saturated control value, and a factor linked to the introduced oxygen setpoint stored in a first memory as the introduced oxygen setpoint correction, and determine the introduced oxygen setpoint by adding the target introduced oxygen setpoint and the introduced oxygen setpoint correction.

10. The control system as claimed in claim 9, wherein the injection corrector comprises a first activator configured to activate the injection corrector when the first control signal is received, and a first calculator configured to determine a second control value as a function of the first control value and the first saturated control value, the injection corrector being configured to determine a second saturated control value saturated as a function of the second control value and maximum and minimum limits, and to emit a second control signal when the second control value is saturated, determine a correction of the fuel pressure in an injector supply rail as a function of the second saturated control value and a factor linked to the fuel pressure as the fuel injection pressure correction, and determine a correction of the start of injection as a function of the second control value and a factor linked to the start of injection as the start of injection correction, and the charging pressure corrector comprises a second activator configured to activate the charging pressure corrector when the second control signal is received, and a second calculator configured to determine a third control value as a function of the second control value and the second saturated control value, the charging pressure corrector configured to determine the charging pressure correction as a function of the third control value and a factor linked to charging pressure.

11. The control system as claimed in claim 9, wherein the injection corrector comprises a first activator configured to activate the injection corrector when the first control signal is received, and a first calculator configured to determine a second control value as a function of the first control value and the first saturated control value, the injection corrector being configured to determine a second saturated control value saturated as a function of fuel pressure in an injector supply rail, as a function of the second saturated control value and a maximum limit value and a minimum limit value linked to the fuel pressure in the injector supply rail, and to emit a third control signal when the second control value is saturated, determine a correction of the fuel pressure in the injector supply rail as a function of the second saturated control value and a factor linked to the fuel pressure to obtain the fuel injection pressure correction, determine a third saturated control value saturated as a function of a start of injection, as a function of the third saturated control value and a maximum limit value and a minimum limit value linked to the start of injection, and emit a fourth control signal when the third saturated control value is saturated, determine a correction of the start of injection as a function of the third saturated control value and a factor linked to the start of injection as the start of injection correction, and emit a second control signal when the third control signal or the fourth control signal is received, and the charging pressure corrector comprises a second activator configured to activate the charging pressure correction corrector when the second control signal is received, a second calculator configured to determine a third control value as a function of the second control value, the second saturated control value, and the third saturated control value, the charging pressure corrector being configured to determine the charging pressure correction as a function of the third control value and a factor linked to charging pressure.

12. The control system as claimed in claim 9, wherein the cascade controller is configured to determine a presence of a cylinder pressure sensor, determine a temperature of at least one cylinder of the internal combustion engine, calculate the target introduced oxygen setpoint, emit an absent cylinder pressure sensor signal indicating an absence of the cylinder pressure sensor when no first control signal is received or when a value outside a permitted range is received at an input of the cascade controller, transmit the value outside the permitted range, and emit a present cylinder pressure sensor signal indicating the presence of the cylinder pressure sensor when a value within the permitted range is received at the input, determine the cylinder temperature as a function of a model, a cylinder pressure, an engine charge, and a crankshaft position, determine the target introduced oxygen setpoint as a function of an inverted model of the nitrogen oxide emissions, the maximum temperature reached in the cylinder and the nitrogen oxide emission setpoint or the corrected nitrogen oxide emission setpoint, when the cylinder pressure sensor is present, and determine the target introduced oxygen setpoint as a function of an inverted model of the nitrogen oxide emissions, the total quantity of fuel injected into the cylinders and the nitrogen oxide emission setpoint or the corrected nitrogen oxide emission setpoint, when the cylinder pressure sensor is absent.

13. The control system as claimed in claim 1, wherein the one or more processors is configured to link the torque setpoint, the nitrogen oxide emission setpoint, and the rotational speed of the internal combustion engine in a first map that is three-dimensional.

14. The control system as claimed in claim 13, wherein the one or more processors utilizes at least a model of the quantity of nitrogen oxides at a level of an exhaust manifold of the engine as a function of (i) at least one operating parameter of the engine, (ii) an introduced oxygen quantity value provided by the air loop controller, (iii) a charging pressure value provided by the air loop controller, and (iv) a fuel injection pressure value provided by the injection controller and a start of injection value provided by the injection controller.

15. The control system as claimed in claim 13, wherein the one or more processors utilizes at least a first map of a nitrogen oxide concentration as a function at least of a cylinder pressure measurement supplied by a cylinder pressure sensor.

16. The control system as claimed in claim 13, wherein the one or more processors is configured to determine the corrected nitrogen oxide emissions setpoint for the nitrogen oxide emissions upstream of the exhaust gas post-treatment system by adding the nitrogen oxide emission setpoint received from the map to one or more of (i) a first correction resulting from a second map as a function of temperature of air introduced into the internal combustion engine, and (ii) a second correction resulting from a third map as a function of temperature of a cooling fluid of the internal combustion engine.

17. The control system as claimed in claim 16, wherein the one or more processors utilizes at least a model of the quantity of nitrogen oxides at a level of an exhaust manifold of the engine as a function of
(i) at least one operating parameter of the engine,
(ii) an introduced oxygen quantity value provided by the air loop controller,
(iii) a charging pressure value provided by the air loop controller, and
(iv) a fuel injection pressure value provided by the injection controller and a start of injection value provided by the injection controller.

18. The control system as claimed in claim 16, wherein the one or more processors utilizes at least a first map of a nitrogen oxide concentration as a function at least of a cylinder pressure measurement supplied by a cylinder pressure sensor.

19. A method for controlling an internal combustion engine provided with a selective catalysis exhaust gas post-treatment system, as a function of a setpoint of nitrogen oxide emissions upstream of the exhaust gas post-treatment system, the method comprising:

closed-loop controlling nitrogen oxides upstream of the selective catalysis exhaust gas post-treatment system by:
  determining the nitrogen oxide emission setpoint upstream of the selective catalysis exhaust gas post-treatment system as a function of at least a rotational speed and a torque setpoint of the internal combustion engine,
  determining a value for the nitrogen oxide quantity upstream of the selective catalysis exhaust gas post-treatment system, and
  determining an introduced oxygen setpoint with a charging pressure correction for an air loop controller of the internal combustion engine, and a fuel injection pressure correction and a start of injection correction for an injection controller of the internal combustion engine, as a function of a difference in nitrogen oxide emissions between the nitrogen oxide emission setpoint or a corrected nitrogen oxide emission setpoint upstream of the selective catalysis exhaust gas post-treatment system and a determined value of the nitrogen oxide quantity upstream of the selective catalysis exhaust gas post-treatment system,
wherein the value for the nitrogen oxide quantity is determined based on an introduced oxygen quantity value and a charging pressure value provided by the air loop controller, and a fuel injection pressure value and a start of injection value provided by the injection controller.

* * * * *